(12) United States Patent
Burgett

(10) Patent No.: US 10,123,052 B2
(45) Date of Patent: Nov. 6, 2018

(54) ELIMINATION OF ARTIFACTS FROM LOSSY ENCODING OF DIGITAL IMAGES BY COLOR CHANNEL EXPANSION

(71) Applicant: Mapbox, Inc., San Francisco, CA (US)

(72) Inventor: Damon Burgett, Berkeley, CA (US)

(73) Assignee: Mapbox, Inc., San Francisco, CA (US)

( * ) Notice: Subject to any disclaimer, the term of this patent is extended or adjusted under 35 U.S.C. 154(b) by 0 days.

(21) Appl. No.: 15/356,403

(22) Filed: Nov. 18, 2016

(65) Prior Publication Data

US 2018/0146214 A1    May 24, 2018

(51) Int. Cl.
| G06K 9/00 | (2006.01) |
| H04N 19/86 | (2014.01) |
| G06T 7/00 | (2017.01) |
| H04N 19/167 | (2014.01) |
| H04N 19/182 | (2014.01) |
| H04N 19/90 | (2014.01) |

(52) U.S. Cl.
CPC ........... H04N 19/86 (2014.11); G06T 7/0085 (2013.01); H04N 19/167 (2014.11); H04N 19/182 (2014.11); H04N 19/90 (2014.11); G06T 2207/10024 (2013.01); G06T 2207/10032 (2013.01)

(58) Field of Classification Search
CPC ................. G06T 7/0083; G06T 7/0085; G06T 2207/10016; G06T 5/001; G06T 5/40; G06T 5/20; G06T 5/50; G06K 9/40; G06K 9/48; H04N 19/86; H04N 19/167
See application file for complete search history.

(56) References Cited

U.S. PATENT DOCUMENTS

| 5,751,852 | A | * | 5/1998 | Marimont | ............ | G06K 9/4638 |
| | | | | | | 382/180 |
| 7,577,313 | B1 | * | 8/2009 | Georgiev | ................ | G06T 5/005 |
| | | | | | | 382/284 |
| 7,768,516 | B1 | * | 8/2010 | Bourdev | ................... | G06T 1/20 |
| | | | | | | 345/501 |
| 9,355,457 | B1 | * | 5/2016 | Kim | ........................ | G06T 7/0085 |
| 2006/0176315 | A1 | * | 8/2006 | Sellers | .................... | G06T 3/403 |
| | | | | | | 345/606 |
| 2010/0007675 | A1 | * | 1/2010 | Kang | ................... | G06F 3/04883 |
| | | | | | | 345/592 |

\* cited by examiner

Primary Examiner — Amir Alavi
(74) Attorney, Agent, or Firm — Fenwick & West LLP

(57) ABSTRACT

A data processing method comprising receiving a digital image file comprising a plurality of digital channel datasets corresponding to a plurality of image channels, wherein the digital image file includes an image region and a non-image region; determining a boundary for the image region; for each channel in the plurality of channels, generating a buffer region by using the digital channel datasets, identifying a plurality of pixels along the boundary and for each pixel of the plurality of pixels, copying the pixel one or more times outward into the non-image region in digital memory; and storing a modified digital image file that includes the buffer region.

20 Claims, 6 Drawing Sheets

ELIMINATION OF ARTIFACTS FROM LOSSY ENCODING OF DIGITAL IMAGES BY COLOR CHANNEL EXPANSION

FIELD OF THE DISCLOSURE

The present disclosure relates to computer-implemented techniques for modifying digital images, especially satellite images for use in digital maps. The disclosure also relates to digital correction of artifacts in digital images that are processed using computers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Satellite imagery is commonly used in computer-implemented digital map programs and applications. Typically, digital images that are received at a computer system from a satellite have to be adjusted and processed into a format that map applications can use. For example, satellite images may have to be combined together and divided into smaller image tiles that correspond to area of a digital map.

Satellite images are taken at a high resolution and at large quantities, which requires significant amounts of storage. A solution for reducing storage requirements is to store the images in a lossy compressed format. However, converting the satellite images to a lossy compressed format results in image artifacts within the converted digital image. The artifacts may result in errors, such as noticeable seams or artifacts along overlapping image areas, when the satellite images are combined. Combining images can result, for example, when images representing adjacent tiles of a map are joined to form a view of a multi-tile area in a map display application. When lossy compression is used to store the tiles, combining tiles can result in jagged edges, black lines, or other visually undesirable errors in the combined image at the joint location. Therefore, there is a need for a technique for reducing or eliminating the appearance of artifacts from digital images to allow for more seamless combined images.

SUMMARY

The appended claims may serve as a summary of the invention.

DETAILED DESCRIPTION

Figure 1:
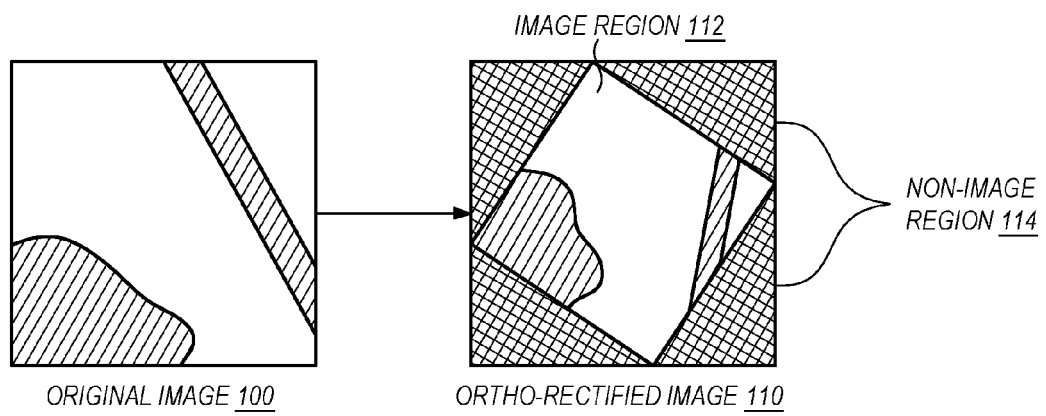
FIG. 1 illustrates an example orthorectified digital image.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
 1.0 GENERAL OVERVIEW
 2.0 DIGITAL IMAGE FILES
 2.1 DIGITAL IMAGE CHANNELS
 2.2 MAP IMAGES
 2.3 ORTHORECTIFIED IMAGES
 2.4 LOSSY IMAGE COMPRESSION
 3.0 STRUCTURAL OVERVIEW
 4.0 FUNCTIONAL OVERVIEW
 4.1 RECEIVING DIGITAL IMAGE FILE
 4.2 DETERMINING IMAGE BOUNDARIES
 4.3 GENERATING IMAGE BUFFER
 4.4 SAVING MODIFIED IMAGE
 5.0 IMPLEMENTATION EXAMPLE—HARDWARE OVERVIEW
 6.0 OTHER ASPECTS OF DISCLOSURE

1.0 General Overview

Computer-implemented techniques are provided for creating modified digital image files that reduce image artifacts along image boundaries when images are joined. In an embodiment, a digital image file is received, and the digital image file comprises a plurality of digital channel datasets corresponding to a plurality of image channels. The digital image file includes an image region and a non-image region. In an embodiment, the digital image file is an orthorectified map image.

After receiving the digital image file, a boundary is determined for the image region. Once the boundary is determined, a buffer region is generated for each channel in the plurality of digital channels, by identifying a plurality of pixels along the boundary and copying each pixel of the plurality of pixels one or more times outward into a non-image region in digital memory. The effect is to expand the digital image outward at the boundary by at least several pixels that are copies of pixels at the boundary. A modified digital image file is stored that includes the buffer region.

In an embodiment, the modified digital image file is a compressed digital image file.

In an embodiment, the steps are performed for a first digital image file and a first modified digital image file is stored. The steps are also performed for a second digital image file and a second modified digital image file is stored. The first modified digital image file is joined to the second modified digital image file along at least a portion of the boundary, resulting in storing a third digital image file. The resulting third digital image file is free of artifacts at the boundary that are usually found in prior approaches.

Other embodiments, aspects and features will become apparent from the disclosure as a whole.

2.0 Digital Image Files

A digital image is the visual representation of image data that is typically stored using an electronic digital storage device, such as memory or disk. Image data, similarly, is data that describes how to render a representation of an image. In an embodiment, image data represents a matrix of picture elements or pixels, and each pixel has a set of values. The pixel values are information that is used to render the pixel at the pixel location. A set of pixel values could be a set of integers, representing discrete data values, or a set of floating point values, representing continuous data values. In some embodiments, each set of pixel values comprises a plurality of different values for component colors of the pixel, and for ease of reference, the set can be termed "a pixel value" in the singular. In other cases, a pixel has a single value for a particular channel, as discussed next.

In an embodiment, a pixel value could be a special data value that indicates a non-image pixel, which may also be referred to as a "NoData" value. Non-image pixels are used to indicate regions of an image that do not contain image data. For example, a non-image region may include image borders, image backgrounds, transparent regions, or data that does not have a valid value. An image renderer may be configured to render a NoData value as a particular color or as a transparent pixel. Additionally or alternatively, a pixel value within a range of valid pixel values may be used to indicate a non-image pixel. For example, a pixel value of "0" or "null" may be used for non-image pixels, even though the same value may also be used for other image pixels.

Thus, in some embodiments, a digital image file may comprise a plurality of digital channel datasets corresponding to a plurality of image channels, and the digital image file includes an image region and a non-image region as further described herein.

2.1 Digital Image Channels

A digital image channel is a set of image data. For example, a digital image channel may comprise a matrix of pixel values, where the location of the pixel value in the matrix corresponds to the location of the pixel within the digital image.

A digital image may comprise a plurality of digital image channels. The image channels may be stored as a set of matrices. Each pixel of the digital image is associated with a plurality of values that correspond to each channel of the image. That is, each matrix stores its own value for each pixel of the image. Each channel of a digital image may be rendered as an individual image. Multiple channels of the digital image may also be combined to create a composite color image. For example, a digital image may comprise a red color channel, a green color channel, and a blue color channel, and data for each channel can be stored in a separate digital file. To render a pixel within the digital image, the value for the pixel for each channel is retrieved and combined to indicate a color within the RGB (Red Green Blue) color space. Additionally or alternatively, three channels within a digital image may be correlated with the red, green, and blue channels respectively, in order to render data into a color image. Other color spaces may be used to render a digital image, including but not limited to, CMY, CMKY, HSV, and HSL.

Additionally or alternatively, image data may include an alpha channel, which may also be referred to as a transparency channel. An alpha value for a pixel indicates a transparency of the pixel. For example, a value of 0 may correspond to a transparent pixel and a value of 1 may correspond to an opaque pixel. If the alpha values are continuous, then the pixel may be semi-transparent. For example, a value of 0.5 corresponds to a 50% transparent pixel. The value of a pixel in the alpha channel may be used, with the value of the pixel in other image channels, to render portions of the digital image as transparent or semi-transparent.

In an embodiment, if a pixel in one or more of the image channels contains a NoData value, the pixel may be rendered as a black or transparent pixel.

2.2 Map Images

In an embodiment, the digital image is a digital map image, such as an aerial photograph, satellite imagery, or a scanned map image. Digital map images may be displayed as a layer within a digital map, or as background of a digital map on which additional map information is displayed. When a region of a digital map is displayed, the region may comprise a plurality of digital map images that are displayed together as a single cohesive image. Additionally or alternatively, two or more digital map images may be combined to form a larger map image corresponding to a particular map view or a map region.

In an embodiment, in order for digital map images to be displayed together in a map, original digital map image files are combined and re-divided into map image tiles. A digital map application may select the image tiles that correspond to a region being displayed in the map. Additionally or alternatively, original digital map image files may have to be correlated with locations or regions of a map. Additionally or alternatively, original digital map image files may have to be processed in order to correspond to a top-down view displayed for a map. Additionally or alternatively, original digital map image files may have to be adjusted so that features displayed in the digital map image are spatially correct. For example, buildings in an image need to be the correct scale or roads need to be the correct size, shape, and location relative to other features.

In additional to image data, a digital map image may include location data and/or other types of geodata. Additionally or alternatively, the pixel values in map image data may correspond to a particular map dataset such as categories (land use classifications), magnitude (population, pollution, rainfall, etc.), height (elevation), and/or spectral values (electromagnetic spectrum bands, light reflectance, and color).

Many types of satellite images comprise multiple channels. Each channel may correspond to a range, or band, of the electromagnetic spectrum or other data collected by a satellite. As an example, spectral bands may include blue, green, red, near-infrared, mid-infrared, far-infrared, thermal infrared, radar, and/or ultraviolet. Different combinations of channels may be selected for rendering a satellite image. For example, a true color image may be rendered using the red, green, and blue channels, which are mapped to their respective colors.

2.3 Orthorectified Images

A digital map image may contain image distortion. For example, when a satellite captures a satellite image, the satellite may be travelling along a path or in an orientation which causes a satellite-mounted camera to be directed other than exactly normal to a plane of the surface of the earth. The satellite movement, location, and/or angle affect the captured satellite image. The image may be keystoned or otherwise orthogonally distorted on one or more axes.

FIG. 1 illustrates an example digital map image. Original image 100 is an original, unmodified digital image. Assume original image 100 is a satellite image that includes distortion due to camera tilt and lens distortion. Due to the distortion, original image 100 may not be spatially accurate if overlaid on a digital map.

Orthorectification is a process of removing the effects of camera tilt, lens distortion, and terrain effects to produce a non-distorted image; it can be represented in computer programs that execute in a computer to digitally correct an image. An orthorectified image has a uniform scale, as if a viewer were looking straight down on the image area, similar to a map. An orthorectified image may be produced by applying any orthorectification algorithm or software to an unrectified digital image.

Referring to FIG. 1, in an embodiment, orthorectification is applied to image 100 to produce orthorectified image 110. Orthorectified image 110 comprises an image region 112 that corresponds to the image shown in original image 100.

When an image is orthorectified, the image may be shifted, skewed, and/or rotated, such that portions of the image file no longer contain image data. As illustrated in FIG. 1, orthorectified image 110 includes a plurality of non-image regions 114. Each pixel in the non-image region may have a NoData value or some other pixel value that corresponds to non-image data. Additionally or alternatively, if orthorectified image 110 comprises a plurality of channels, the pixel value in each channel may have a NoData value.

Figure 2:
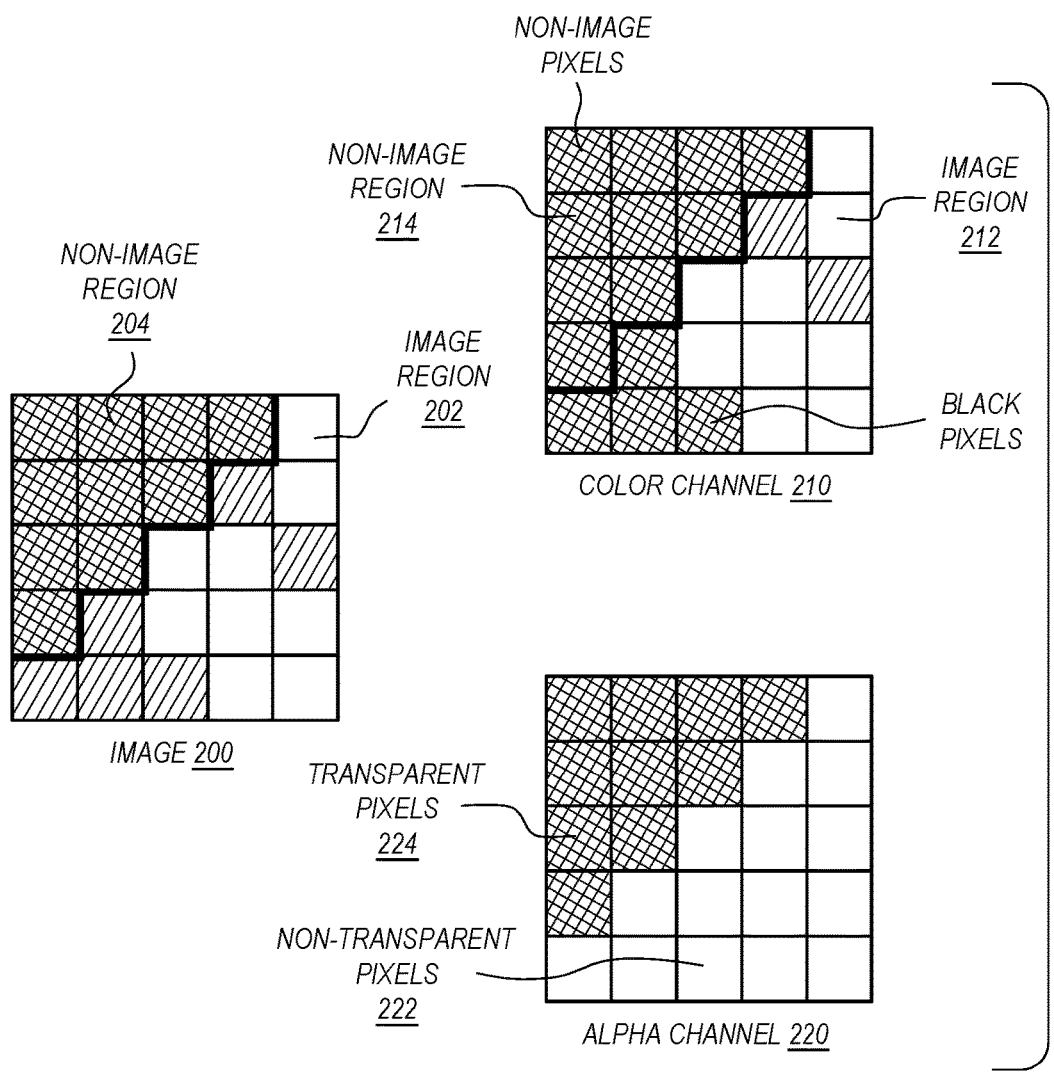
FIG. 2 illustrates example color channel data and alpha channel data for an image.

In an embodiment, an alpha channel may be used to differentiate between image pixels and non-image pixels within an orthorectified image. FIG. 2 illustrates an image with a color channel and an alpha channel. In the illustrated embodiment, image 200 comprises an image region 202 and a non-image region 204. Each pixel of image 200 may be rendered by compositing the values from a plurality of image channels. Image 200 includes a color channel 210 and an alpha channel 220.

Color channel 210 represents one image channel among a plurality of digital image channels for image 200. Color channel 210 comprises a plurality of non-image pixels 214 and a plurality of image pixels 212. A different channel for image 200 may have the same non-image pixels, but the pixels with image data may contain different values.

In the illustrated example, the image pixels of color channel 210 include a plurality of black pixels that contain the same data value as the non-image pixels. Additionally or alternatively, the data value of a non-image pixel may be different, but the non-image pixels may be rendered the same as a black pixel within the digital image.

Alpha channel 220 may be used to differentiate between the image region and the non-image region of image 200. Alpha channel 220 comprises a plurality of transparent pixels 224 and a plurality of non-transparent pixels 222. As illustrated in FIG. 2, the transparent pixels 224 correspond to the pixels in non-image region 204, while the non-transparent pixels 222 correspond to the pixels in image region 202. By comparing the pixel values stored in alpha channel 220 with the pixel values of color channel 210, the image pixels 212 of color channel 210 may be distinguished from the non-image pixels 214.

2.4 Lossy Image Compression

Digital images may be compressed in order to reduce the size of the digital image file. A compressed image may require less storage space, transmit faster across a communication network, and/or render faster on a digital display. A compressed image file may also have fewer pixels than an uncompressed image file.

One type of image compression is lossy image compression. Lossy image compression is a type of irreversible compression that uses approximations to represent the image content. Image file size is reduced for storage, handling, and data transmittal, but parts of the original image may be discarded during the compression process. Examples of image files that support lossy image compression may include JPG, JPG 2000, JPG XR, PGF, ICER, WebP, ECW, and SID.

Lossy image compression may result in image artifacts within the digital image. An image artifact is a visual distortion caused by compressing and/or discarding image data. For example, four pixels may be compressed to become a single pixel. The single pixel data may approximate the data from the original four pixels, but a single pixel may not accurately reproduce or represent the area of the original image. Image artifacts may appear as blocky or checker-boarded regions, color degradation, and/or blurred or inaccurate image edges. The size, shape, quantity, and location of image artifacts may differ depending on the digital image and the compression algorithm used to produce the compressed image file.

In an embodiment, if a digital image comprises a plurality of digital image channels, each image channel may contain different image artifacts. This may result in inaccurate image boundaries for orthorectified images. For example, image artifacting may cause a color channel to store a NoData value at a particular pixel, while an alpha channel stores data indicating that the particular pixel is an image pixel. When the image is rendered, the NoData value at the color channel may be treated as a valid image pixel, such as a valid black pixel, rather than a non-image pixel.

3.0 Structural Overview

Figure 3:
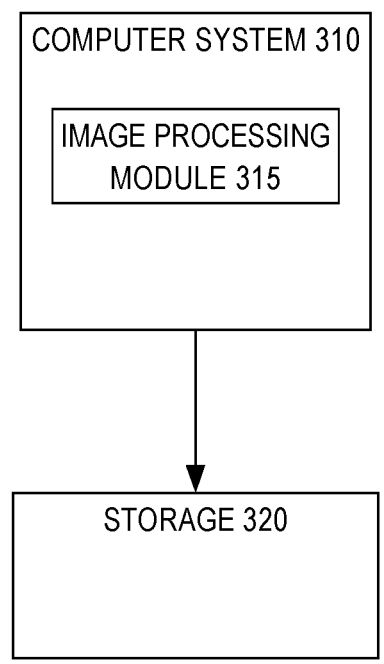
FIG. 3 illustrates an example computer system in which the techniques described may be practiced, according to one embodiment.

FIG. 3 illustrates an example computer system 310 in which the techniques described herein may be practiced, according to one embodiment. Computer system 310 includes an image processing module 315 and storage 320. Embodiments of the computer system 310 include, but are not limited to, a standalone computer system that includes data storage and display components, a multiple computer server system with multiple components configured and implemented on multiple computer systems, or a multiple computer server system with multiple components configured and implements on server systems located within a cloud server.

Storage 320 may be any suitable data storage device such as one or more hard disk drives, memories, database, cloud-based storage, or other electronic digital data storage media configured to store data. Although storage 320 is depicted as a single device in FIG. 3, storage 320 may span multiple devices located in one or more physical locations. Additionally, in one embodiment, storage 320 is located on the same device(s) as computer system 310. Alternatively, storage 320 may be located on a separate device from computer system 310.

In an embodiment, image processing module 315 comprises executable instructions loaded into a set of one or more pages of main memory, such as RAM, in the computer system 105 which when executed cause the computer system 310 to perform the functions or operations that are described herein. For example, image processing module 315 may comprise executable instructions loaded into a set of pages in RAM that contain instructions which when executed cause performing data rendering functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture.

In another embodiment, image processing module 315 may represent one or more files or projects of source code that are digitally stored in a mass storage device such as non-volatile RAM or disk storage, in the computer system 310 or a separate repository system, which when compiled or interpreted cause generating executable instructions which when executed cause the computer system 310 to perform the functions or operations that are described herein with reference to those modules. In other words, the drawing figure may represent the manner in which programmers or software developers organize and arrange source code for later compilation into an executable, or interpretation into bytecode or the equivalent, for execution by the computer system 310. The executable instructions in memory, or the stored source code, specified in this paragraph are examples of "modules" as that term is used in this disclosure.

In an embodiment, image processing module 315 includes instructions to request or retrieve one or more digital image files from storage 320, process the one or more digital image files, and generate a modified digital image file. Processing the one or more digital image files may involve, for each channel, copying a plurality of pixels to form a buffer region and transiently storing each modified image channel in memory. Image processing module 315 may store the set of modified image channels as a new digital image file of the same digital image file format. Additionally or alternatively, image processing module 315 may store the set of modified image channels in a new digital image file format. For example, the original digital image file may be stored in an uncompressed format, and storing the modified image file includes compressing the digital image and storing the compressed digital image file.

Additionally, image processing module 315 may include instructions to combine two or more modified digital image files to form a single digital image file.

For the purpose of illustrating a clear example, the foregoing description has ascribed certain operations, functions, and programming to the image processing module 315 of FIG. 1. However, in other embodiments, the same operations, functions, and programming may be implemented in programs or logic that is separate from the image processing module 315, such as a utility program or library. For example, the function of determining an image boundary may be implemented in a library that the image processing module 315 calls. Additionally or alternatively, image processing module 315 may communicate or interface with any other applications, software, or modules that are executed by computer system 315, such as operating systems or drivers, as needed to implement the functionality described herein.

4.0 Functional Overview

In an embodiment, a data processing method may be configured to receive or retrieve a digital image file, determine one or more boundaries of image regions defined by digital image data, generate a buffer region for each image channel in the image file, and store a modified digital image file. In an embodiment, the data processing method may be further configured to combine two modified image files and store a combined image file.

4.1 Receiving Digital Image File

Figure 4:
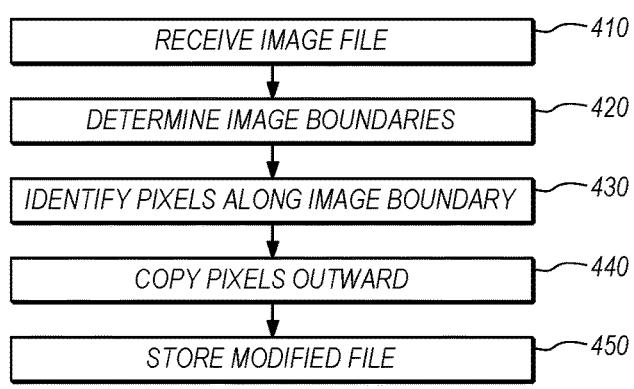
FIG. 4 illustrates a programmable algorithm or method in accordance with an embodiment.

FIG. 4 illustrates a process for generating a modified digital image file. In step 410, a computer system receives a digital image file comprising a plurality of digital channel datasets. For example, image processing module 315 may automatically receive one or more digital image files from a server computer or another application or module. Additionally or alternatively, a user may specify one or more digital image files for image processing module 315 to process, and image processing module 315 retrieves or requests the one or more digital image files from storage 310.

The digital image file may define one or more image regions and one or more non-image regions. Additionally or alternatively, the digital image file may be an orthorectified image. Additionally or alternatively, the digital image file includes an alpha channel that defines the one or more image regions and the one or more non-image regions.

4.2 Determining Image Boundaries

In step 420, the computer system determines one or more image boundaries within the digital image. Determining one or more image boundaries may comprise determining one or more image regions defined within the digital image. In an embodiment, any known edge detection or boundary detection algorithm may be used to determine the one or more image boundaries.

Additionally or alternatively, the digital image file may include an alpha channel. The alpha channel may be used to determine the one or more image regions. For example, the alpha channel may store a first value corresponding to image pixels and a second value corresponding to non-image pixels. The image pixels adjacent to non-image pixels within the alpha channel form the boundary of an image region.

4.3 Generating Image Buffer

Once the one or more image regions are identified, the computer system generates one or more buffer regions within the digital image. The buffer region is an expanded boundary between an image region and a non-image region. That is, non-image pixels are modified to contain valid image data.

In an embodiment, a buffer region is generated for each image channel of the digital image, but is not generated for an alpha channel of the digital image. For example, if the digital image file includes a red color channel, a blue color channel, a green color channel, and an alpha channel, a buffer region may be generated for each of the color channels.

In an embodiment, the size of the buffer region is defined by a user, by a configuration file, settings, preferences, and/or some other configuration data. The size of the buffer region is based on the size of the largest image artifact. For example, if the size of the largest artifact generated by a particular compression algorithm is 3 pixels, then the buffer region may be configured to be 4 pixels wide.

Additionally or alternatively, the size of the buffer region is automatically determined based on a selected image compression algorithm. Each image compression algorithm may result in a different maximum size artifact. The size of the buffer region is at least one pixel greater than the maximum size artifact generated by the image compression algorithm used.

Figure 5:
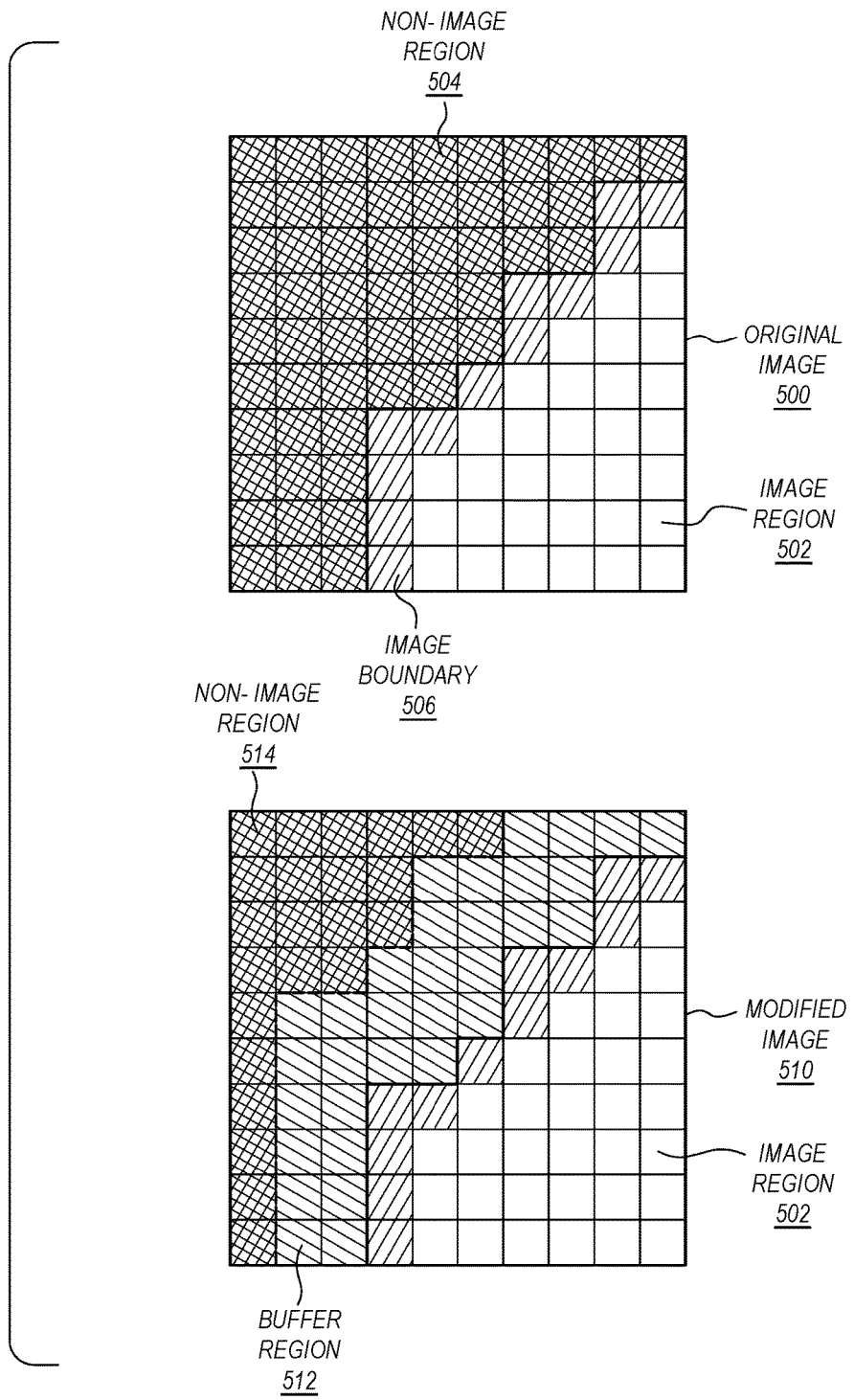
FIG. 5 illustrates an example image with a buffer region.

FIG. 5 illustrates a modified image with a buffer region. Original image 500 comprises an image region 502 and a non-image region 504. As illustrated in FIG. 5, image boundary 506 comprises a plurality of pixels that are located along the edge of image region 502.

At step 430, the computer system identifies a plurality of pixels along the image boundary. For example, image processing module 315 identifies the pixels comprising image boundary 506 in original image 500.

In an embodiment, the computer system at step 420 identifies one or more image regions, and identifying the boundary pixels comprises identifying the pixels along the edge of each of the one or more image regions determined in step 420. Additionally or alternatively, the boundary pixels may be determined for each image channel of the digital image.

At step 440, the computer system copies each boundary pixel outward to generate the buffer region. Copying a pixel may comprise copying the pixel value of a boundary pixel to a pixel in the buffer region. That is, the original pixel value stored in an image matrix is replaced with the pixel value of the source boundary pixel.

Referring to FIG. 5, modified image 510 is the same size as original image 500. The boundary pixels 506 of original image 500 are copied outwards to generate buffer region 512. Image region 502 remains the same, but non-image region 504 is reduced by the addition of the buffer region 512. Modified image 510 comprises image region 502, buffer region 512, and a modified non-image region 514.

In an embodiment, each pixel is copied linearly outwards a number of times from the image region towards the non-image region. The number of times the pixels are copied may be based on the size of the buffer region. Additionally or alternatively, pixels may be copied radially outwards. For example, a pixel at a corner of the boundary may be copied diagonally outwards.

Additionally or alternatively, the pixels comprising the buffer region are determined, based on the size of the buffer region. The boundary pixel closest to each buffer region pixel is identified, and the value of the boundary pixel is copied to the buffer region pixel. Thus, each buffer region pixel contains the value of the boundary pixel closest to it.

4.4 Saving Modified Image

At step 450, the computer system stores a modified digital image file. For example, image processing module 315 stores the modified digital image file in storage 320. The modified digital image file may comprise a set of modified image channels, where each channel includes the buffer region generated at step 440. Image processing module 315 may store the set of modified image channels as a new digital image file of the same digital image file format. Additionally or alternatively, image processing module 315 may store the set of modified image channels in a new digital image file format.

In an embodiment, image processing module 315 may compress the modified image file using lossy image compression prior to storing the file. Additionally or alternatively, the computer system may send the modified image file to another computer system, application, or module to compress and store a compressed modified image file.

Two or more modified image files may be combined to form a seamless image file. Combining two modified image files may comprise identifying corresponding edges from a first digital image and a second digital image, and combining the first and second digital images along the corresponding edges. Any known image mosaicking or image stitching techniques may be used to combine the two or more modified image files.

In an embodiment, the alpha channel of a modified image file does not include a buffer region. When the alpha channel is used to identify edges of a digital image, the pixels within the buffer region and the non-image region of each modified image channel are identified as non-image pixels. Thus, when two modified image files are combined, image artifacts between the buffer region and the non-image regions are hidden, resulting in a seamless combined image.

The computer system may retrieve the two or more modified image files from storage after the two or more modified image files have been saved. For example, image processing module 315 may retrieve the two or more modified image files from storage 320. Additionally or alternatively, the computer system may temporarily store modified image files in memory, combine two or more modified image files, and store a combined image file in storage 320. Additionally or alternatively, the computer system may store modified image files and send the modified image files to another computer system, application, or module to combine.

5.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
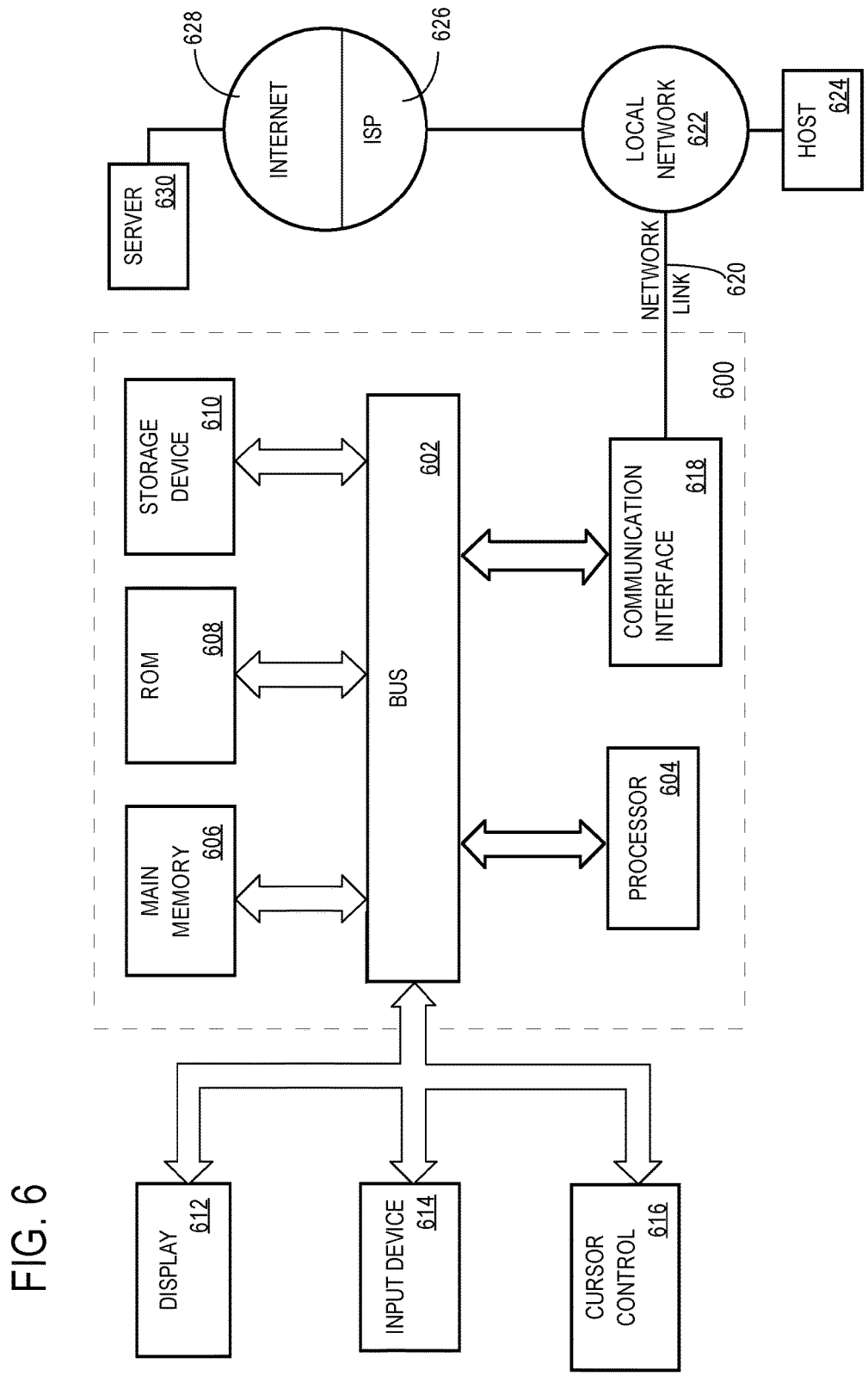
FIG. 6 illustrates a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

6.0 Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method comprising:
 receiving a digital image file comprising a plurality of digital channel datasets corresponding to a plurality of image channels, wherein the digital image file includes an image region comprising pixels that encode image data and a non-image region comprising pixels that do not encode image data;

determining a boundary for the image region;

for each channel in the plurality of channels, generating a buffer region by:

using the digital channel datasets, identifying a plurality of pixels along the boundary;

for each pixel of the plurality of pixels, copying the pixel one or more times outward from the image region into pixels of the non-image region adjacent to the boundary, to reduce artifact creation along the boundary; and storing a modified digital image file that includes the buffer region.

2. The method of claim 1 further comprising:
receiving a buffer value;
wherein the number of times a pixel value is copied is equal to the buffer value.

3. The method of claim 1, wherein the modified digital image file is compressed, wherein compressing the digital image file generates a plurality of image artifacts within the image region;
the method further comprising determining a maximum artifact size for the plurality of image artifacts;
wherein the number of times a pixel value is copied is greater than the maximum size of the plurality of image artifacts.

4. The method of claim 1, wherein the modified digital image file is a compressed digital image file.

5. The method of claim 1, wherein the image region is an orthorectified map image.

6. The method of claim 1, wherein the plurality of channels includes an alpha channel, wherein the alpha channel indicates the image region of the digital image file, and wherein the identifying and expanding are not performed for the alpha channel.

7. The method of claim 6, wherein determining the boundary of the image region is based at least in part on the alpha channel.

8. The method of claim 1 wherein the modified image file further includes the image region and a modified non-image region.

9. The method of claim 1, further comprising:
performing the steps of claim 1 using a first digital image file, resulting in storing a first modified digital image file;
performing the steps of claim 1 using a second digital image file, resulting in storing a second modified digital image file;
joining the first modified digital image file to the second modified digital image file along at least a portion of the boundary; and
storing a third digital image file comprising the joined first modified digital image file and second modified digital image file.

10. The method of claim 1, further comprising:
performing the steps of claim 1 using a first digital image file, resulting in storing a first modified digital image file;
performing the steps of claim 1 using a second digital image file, resulting in storing a second modified digital image file;
joining the first modified digital image file to the second modified digital image file along at least a portion of the boundary; and
rendering the joined first modified digital image file and second modified digital image file.

11. A computer system comprising:
one or more processors;
one or more non-transitory computer-readable media storing instructions which, when executed by the one or more processors, cause the one or more processors to perform:
receiving a digital image file comprising a plurality of digital channel datasets corresponding to a plurality of image channels, wherein the digital image file includes an image region comprising pixels that encode image data and a non-image region comprising pixels that do not encode image data;
determining a boundary for the image region;
for each channel in the plurality of channels, generating a buffer region by:
using the digital channel datasets, identifying a plurality of pixels along the boundary;
for each pixel of the plurality of pixels, copying the pixel one or more times outward from the image region into pixels of the non-image region adjacent to the boundary, to reduce artifact creation along the boundary; and
storing a modified digital image file that includes the buffer region.

12. The system of claim 11 further comprising:
receiving a buffer value;
wherein the number of times a pixel value is copied is equal to the buffer value.

13. The system of claim 11, wherein the modified digital image file is compressed, wherein compressing the digital image file generates a plurality of image artifacts within the image region;
the method further comprising determining a maximum artifact size for the plurality of image artifacts;
wherein the number of times a pixel value is copied is greater than the maximum size of the plurality of image artifacts.

14. The system of claim 11, wherein the modified digital image file is a compressed digital image file.

15. The system of claim 11, wherein the image region is an orthorectified map image.

16. The system of claim 11, wherein the plurality of channels includes an alpha channel, wherein the alpha channel indicates the image region of the digital image file, and wherein the identifying and expanding are not performed for the alpha channel.

17. The system of claim 16, wherein determining the boundary of the image region is based at least in part on the alpha channel.

18. The system of claim 11 wherein the modified image file further includes the image region and a modified non-image region.

19. The system of claim 11, further comprising:
performing the steps of claim 11 using a first digital image file, resulting in storing a first modified digital image file;
performing the steps of claim 11 using a second digital image file, resulting in storing a second modified digital image file;
joining the first modified digital image file to the second modified digital image file along at least a portion of the boundary; and
storing a third digital image file comprising the joined first modified digital image file and second modified digital image file.

20. The system of claim 11, further comprising:
performing the steps of claim 11 using a first digital image file, resulting in storing a first modified digital image file;
performing the steps of claim 11 using a second digital image file, resulting in storing a second modified digital image file;
joining the first modified digital image file to the second modified digital image file along at least a portion of the boundary; and
rendering the joined first modified digital image file and second modified digital image file.

* * * * *